United States Patent [19]
Golshani et al.

[11] Patent Number: 5,806,066
[45] Date of Patent: Sep. 8, 1998

[54] METHOD OF INTEGRATING SCHEMAS OF DISTRIBUTED HETEROGENEOUS DATABASES

[75] Inventors: Forouzan Golshani, Paradise Valley; Oris D. Friesen; Thomas H. Howell, both of Scottsdale, all of Ariz.

[73] Assignee: Bull HN Information Systems Inc., Billerica, Mass.

[21] Appl. No.: 624,726

[22] Filed: Mar. 26, 1996

[51] Int. Cl.[6] .................................................. G06F 17/00
[52] U.S. Cl. .......................... 707/100; 707/102; 707/103
[58] Field of Search .................... 395/601, 610, 395/611, 613, 614; 707/100, 102, 103

[56] References Cited

U.S. PATENT DOCUMENTS

| | | | |
|---|---|---|---|
| 5,560,005 | 9/1996 | Hoover et al. | 395/600 |
| 5,596,744 | 1/1997 | Dao et al. | 395/610 |

*Primary Examiner*—Paul R. Lintz
*Assistant Examiner*—Donald Min
*Attorney, Agent, or Firm*—J. S. Solakian; E. W. Hughes

[57] ABSTRACT

A method for integrating the schemas of a plurality of independent and heterogeneous database management systems of a distributed database management system (DDBMS). The DDBMS includes a computer system in which the DDBMS resides and one or more subservient computer systems. The schemas of two of the independent database systems are fetched from the subservient computer systems. The schemas are converted from a relational database form to an object-oriented form. The schemas are then normalized and displayed graphically. Equivalencies are identified and the two schemas are integrated. These steps are repeated until the schemas of all data bases to be integrated have been integrated into a single integrated, or global schema. The global schema is then converted from the object-oriented form to the relational form, and SQL commands are created to allow data from subservient databases to be obtained to create a virtual database residing in the host computer system satisfying the requirements of the global integrated schema.

12 Claims, 18 Drawing Sheets

METHOD OF INTEGRATING SCHEMAS OF DISTRIBUTED HETEROGENEOUS DATABASES

CROSS REFERENCES TO RELATED APPLICATIONS

U.S. patent application Ser. No. 08/624,722, currently pending, of Forouzan Golshani et al entitled Method for Converting a Database Schema in Relational Form to a Schema in Object-Oriented Form:

U.S. patent application Ser. No. 08/624,725, currently pending, of Forouzan Golshani et al entitled Method of Graphically displaying an Object-Oriented Schema:

U.S. patent application Ser. No. 08/624,724, currently pending, of Forouzan Golshani et al entitled Graphical Interface for Correspondence Specification in Schema Integration: and U.S. patent application Ser. No. 08/624,723, currently pending, of Forouzan Golshani et al entitled Method for Generating SQL Commands to Create an Integrated Global Schema; all of which applications were filed concurrently herewith, all of which are assigned to the assignee of the present invention, and all of which are incorporated herein by reference and made a part hereof as if fully set forth herein.

FIELD OF THE INVENTION

This invention relates to distributed database management systems and more particularly to a method of integrating the schemas of such systems to produce a single global schema, where a schema is a representation of the structure of the database that illustrates what kind of data is stored in the database as opposed to the actual data. This invention is a method, or software tool, for creating an overall coherent global schema that contain desired objects and their associated attributes. This invention includes the generation of the required Database Language SQL commands needed to create a global virtual database representing the integrated (i.e. merged) schemas of the original database systems of interest.

BACKGROUND OF THE INVENTION

Many enterprises have accumulated throughout the years, either by expansion or by acquisition, a number of database management systems (DBMS)s. These systems are generally heterogeneous in that they differ from one another with respect to platform, or computer system in which they reside, data model, language for implementation, languages for querying and updating, schema, and data types. With the trend toward inter-operability in enterprises, it has become more and more necessary for the existing database management systems to cooperate and to exchange data. Without a software tool, or method, for schema integration, a user must either manually retrieve the local schemas of other database systems of interest or guess what may be available on other desired database systems which reside at a remote site. Without a global (integrated) schema, any query involving retrieval from more than one database system must be broken down manually, and partial answers received from the participating database systems must be merged by the user.

Schema Integration is the integration of a plurality of existing schemas into a single logical schema. The object is to provide a new and coherent view of the components of multiple database management systems. Usually these database management systems are heterogeneous and originally were not designed to be inter-operable.

While the various phases of schema integration are fairly well understood; to date no one has developed a software tool, or method, with the necessary capabilities actually to integrate a plurality of heterogeneous databases of a distributed database system to produce a single integrated schema. For a summary of schema integration studies and research, see C. Batini, M. Lenzerini, S. B. Navathe. "Comparative Analysis of Methodologies for Database Integration" *ACM Computing Surveys*. 18, 4 Dec., 1986. 323–364, and A. Sheth, J. A. Larson. "Federated Database Systems for Managing Distributed, Heterogeneous, and Autonomous Databases" *ACM Computing Surveys*. 22, 3 Sept., 1990. 183–236.

SUMMARY AND THE OBJECTS OF THE INVENTION

The present invention is a software tool, or method, that generates and preserves an integrated global schema, which enables the user to present queries against a single global schema (that represents in a coherent manner all the desired data objects in all of the participating databases and all the relationships among the data objects) without any concern about where the data may come from or its physical environment.

It is therefore a broad object of this invention to provide a schema integration tool that is designed to fulfill the following needs:

An intuitive and friendly user interface that assists the database designer in the pre-integration phase;

A software module, or step of the process, for translating relational schemas into an object-oriented schema, which allows a user to deal with the schema elements as objects in an object-oriented database system;

A user interface that allows the specification of assertions during the third step of integration namely the conformation phase;

A software module for processing user assertions to merge two schemas; and

An algorithm for the generation of a set of SQL commands for the rendition of a relational view (i.e., the entire schema, or a part of it if so desired) that integrates the different schemas under consideration as per given assertions. To summarize, the novel features and functions embodied in this software tool are presented below:

1. Deduction of keys and dependencies in relational schemas, including both primary keys which are the unique identifiers of the relations and foreign keys which are attributes of a relation that correspond to a key of another relation;

2. Transformation of relational schemas in arbitrary form into schemas in "Third Normal Form"; i.e. that conform to a set of requirements known as the "Third Normal Form" for relational database systems;

3. Flexibility in operation and a friendly interface;

4. An algorithm for transforming relational schemas into object-oriented schemas;

5. Graphical representation of object-oriented schema constituents;

6. Specification of correspondences between the objects of two schemas using a Graphical User Interface;

7. Integration of object-oriented schemas;

8. Generation of a global object-oriented schema in object-oriented form based on the correspondences specified by the user;
9. Converting a global object-oriented schema into an integrated relational schema; and
10. Generation of appropriate SQL commands for creating a working integrated schema in the host distributed data management system which is resident in a host computer system.

It is, therefore, a further object of this invention to provide an improved method for integrating a collection of heterogeneous databases into one coherent system.

It is yet another object of this invention to create an intelligent method, or software tool, that will assist the user of distributed heterogeneous database systems to integrate the schemas of the underlying heterogeneous data management systems so that the set of participating databases can be viewed as one coherent database system.

BRIEF DESCRIPTION OF THE DRAWING

The subject matter of the invention is particularly pointed out and distinctly claimed in the concluding portion of the specification. The invention, however, both as to organization and method of operation, may best be understood by reference-to the following description taken in conjunction with the subjoined claims and the accompanying drawings of which:

DESCRIPTION OF THE PREFERRED EMBODIMENT

Figure 1:
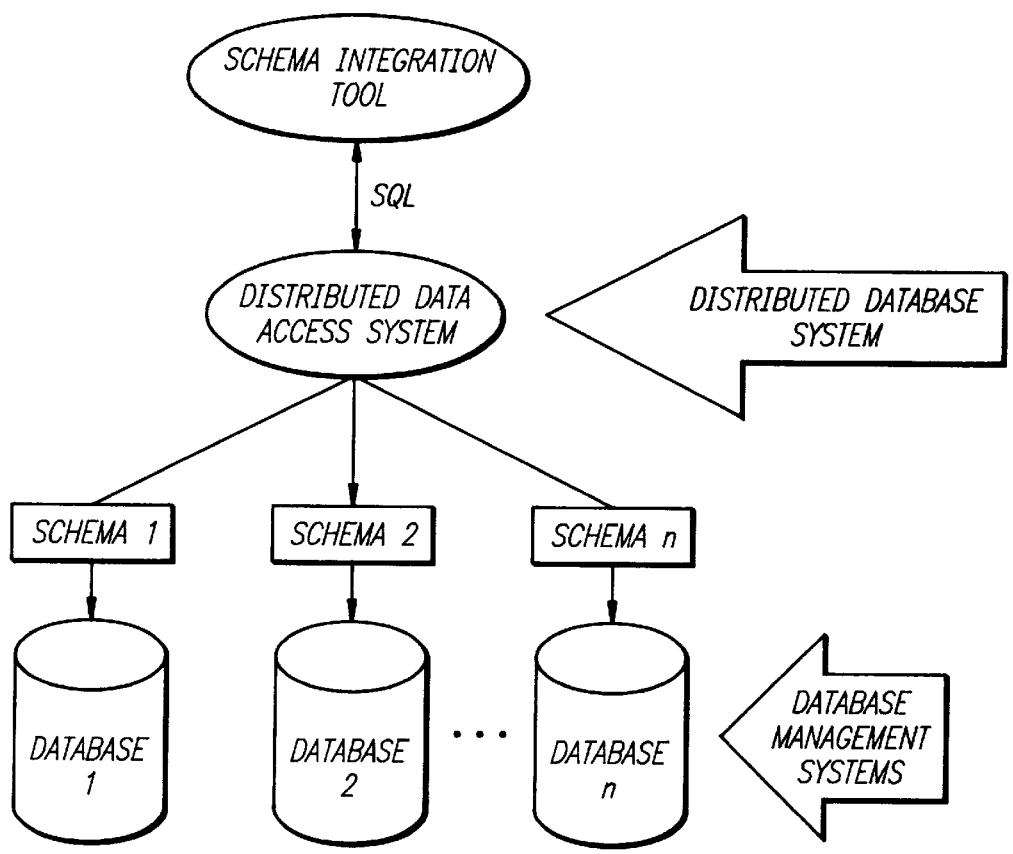
FIG. 1 is a high level view of the architecture of a distributed data management system, which includes a Distributed Data Access (DDA) software module and the necessary gateways and software tools for communication between a computer system in which the distributed database management system is resident with underlying database management systems on underlying computer systems.

FIG. 1, illustrates how the schema integration tool, or method, relates to a distributed data access system and to participating, or underlying, database management systems.

Figure 2:
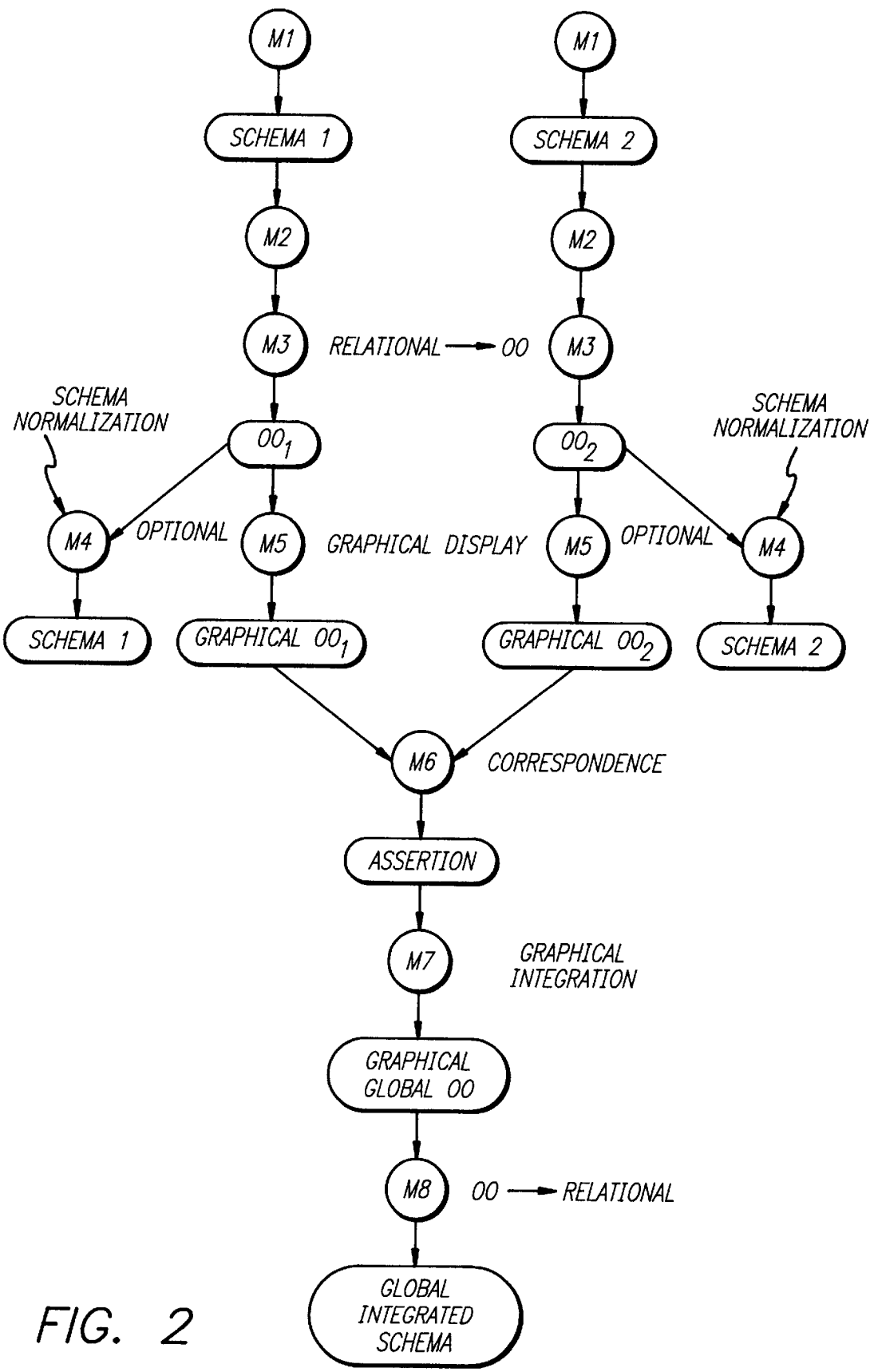
FIG. 2 is a data flow diagram of the components and software modules of the schema integration tool and illustrate the flow of information among the modules.

In the data flow diagram of FIG. 2, a circle including the letter "M" and an Arabic numeral identifies each of the software modules of the integration tool and rectangles represent objects created, or processed, by the software modules of this invention. In the flow charts of FIGS. 3–11, a circle including a Roman numeral identifies a software module of the integration tool, it should be noted that there is not a one to one correspondence between the Arabic numeral and the Roman numerals.

Figure 3A:
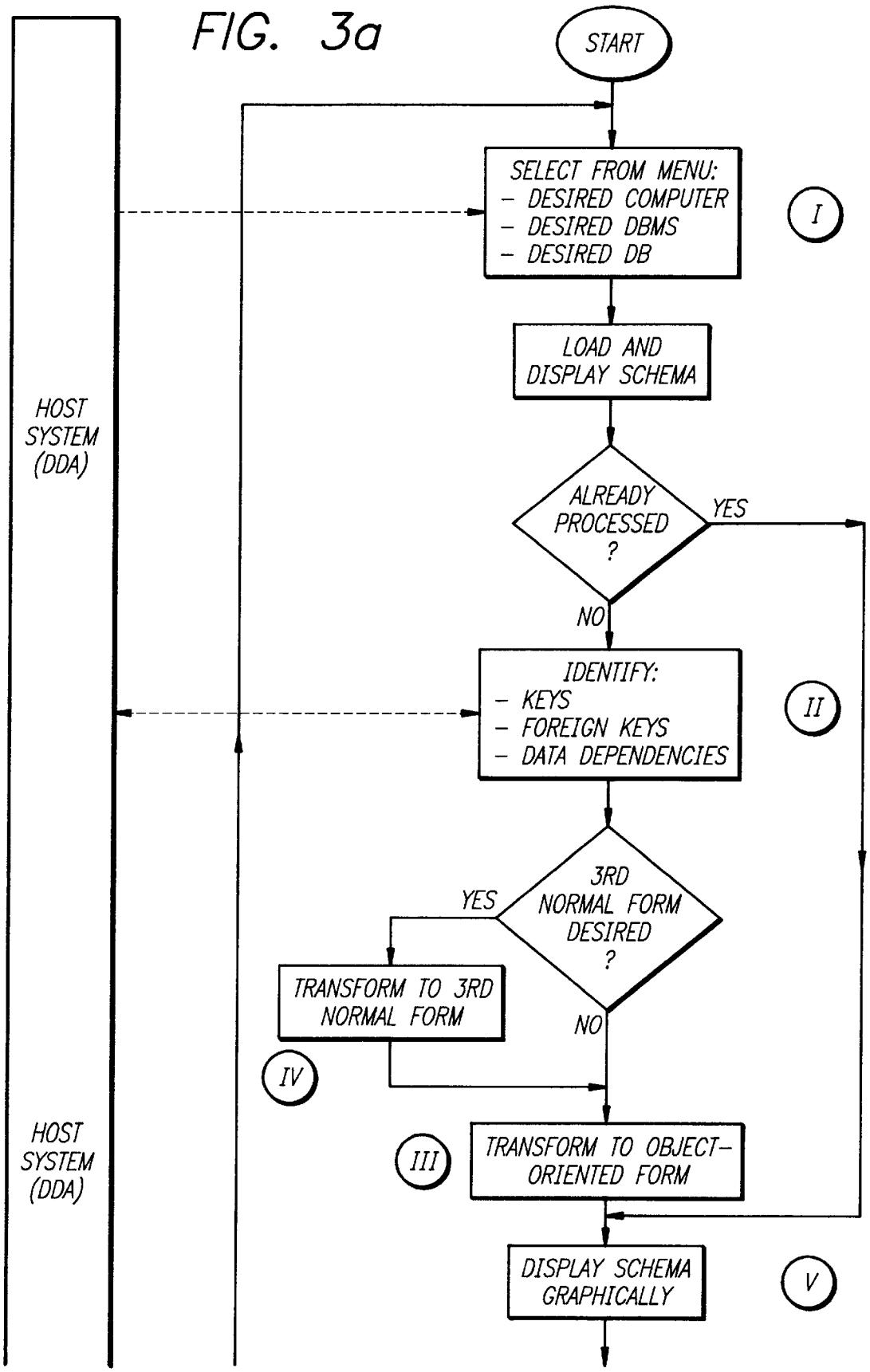
FIGS. 3a, 3b, and 3c are a very high level flow chart that illustrates the necessary steps in the process of schema integration.
Figure 3B:
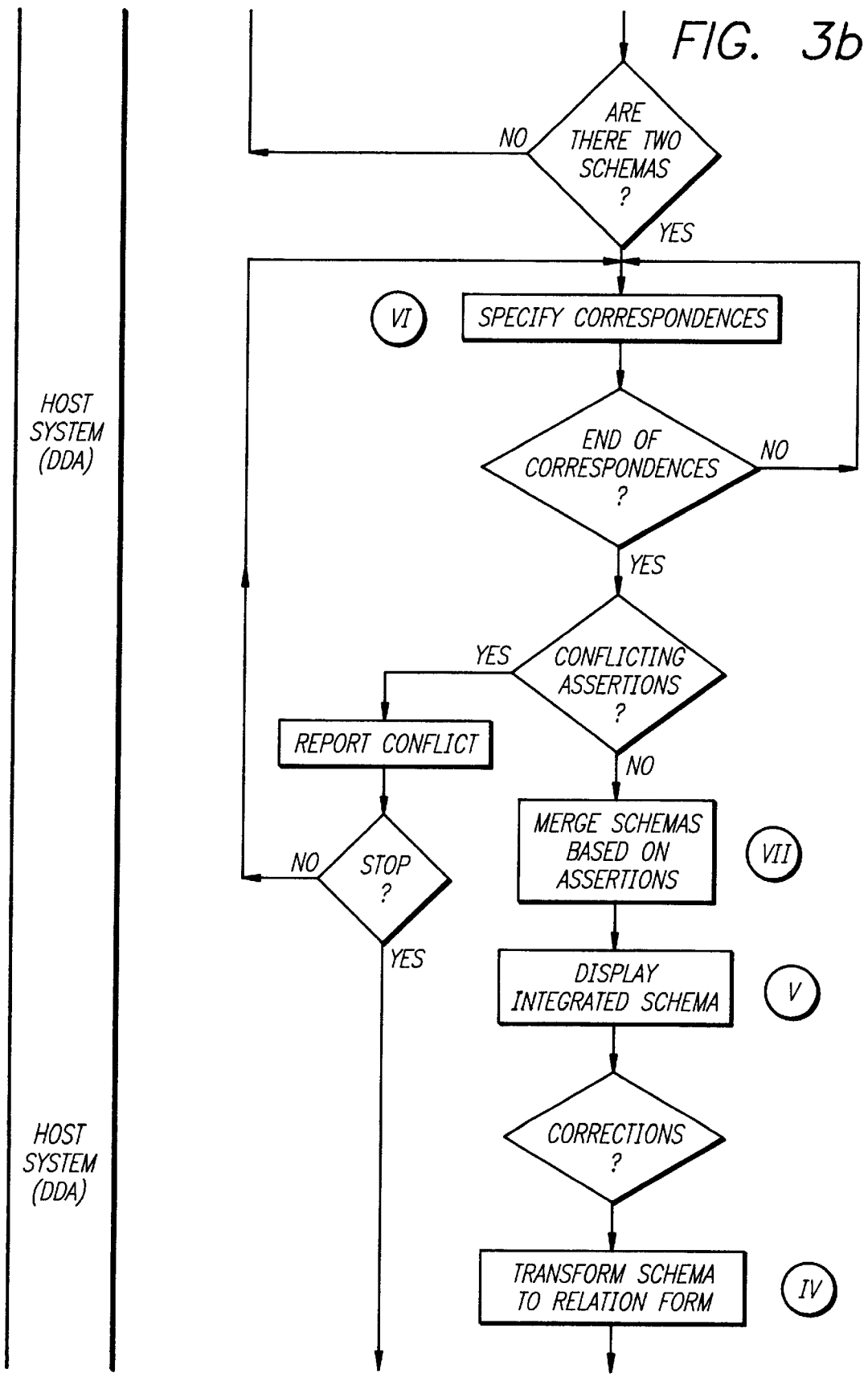
Figure 3C:
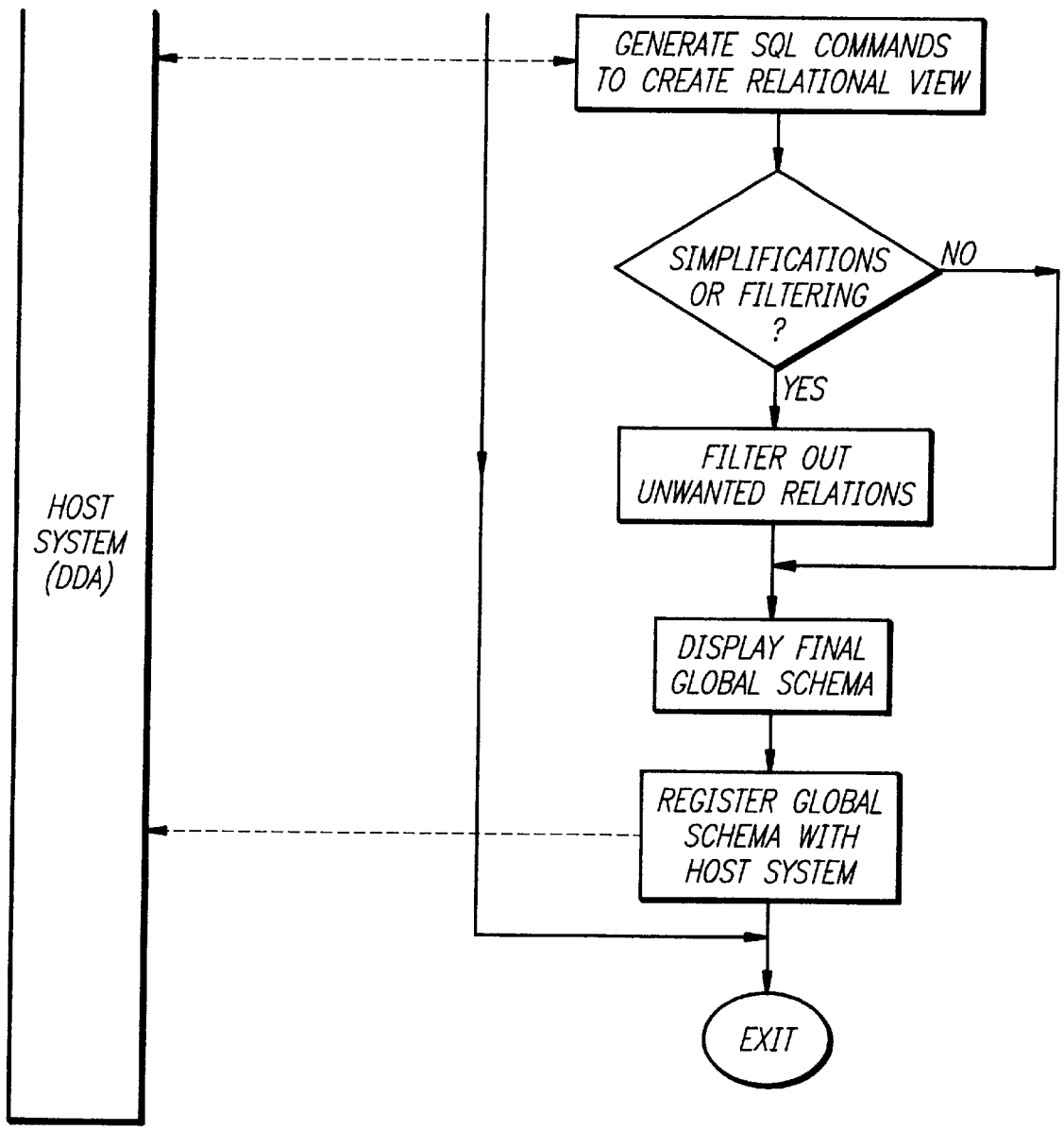

In FIGS. 3a, 3b and 3c, the overall steps of schema integration are set forth, these steps are subsequently broken down into eight more detailed flow charts set forth herebelow.

Figure 4:
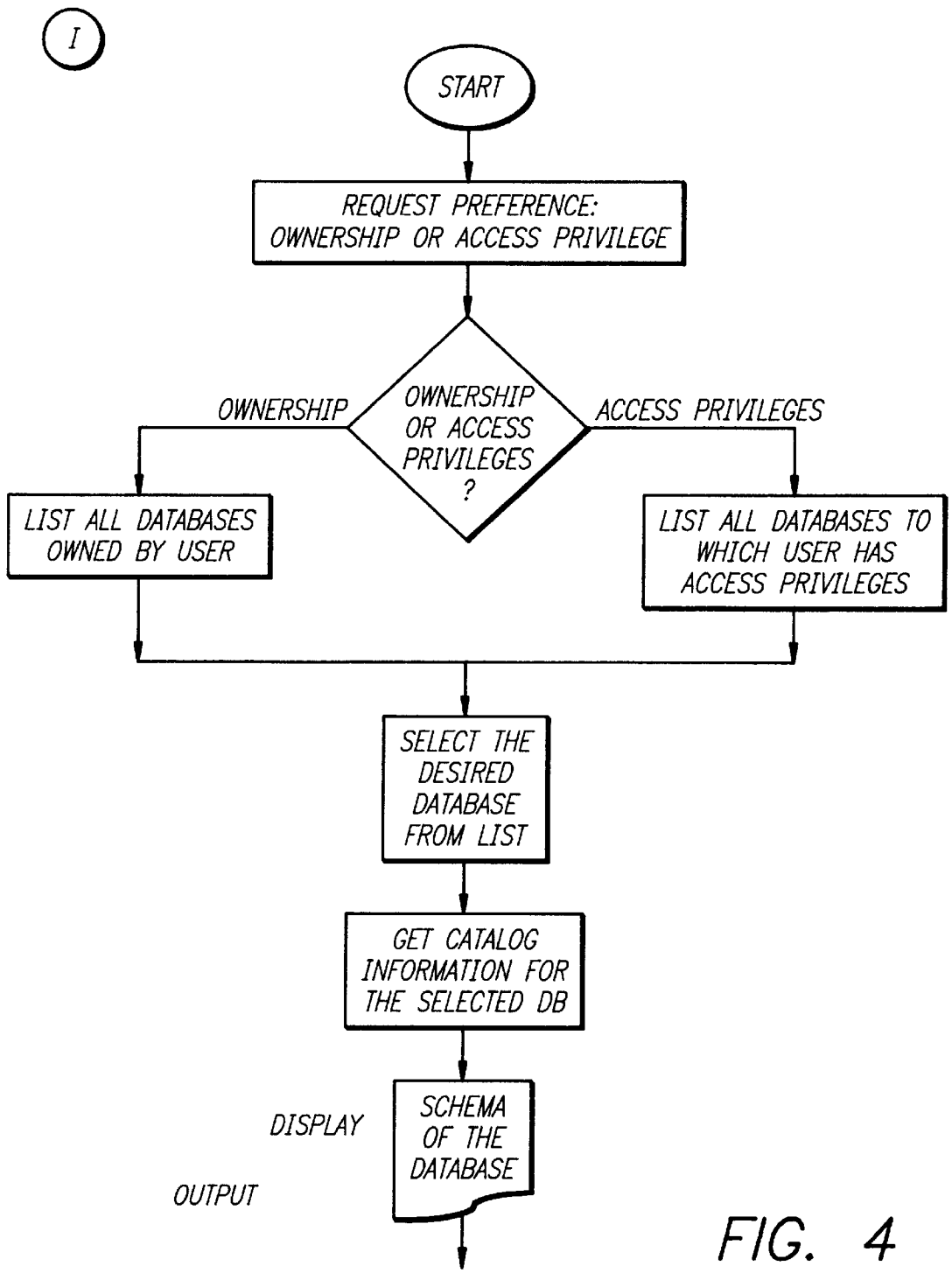
FIG. 4 is a flow chart of the software module that accesses and displays the schema of the desired underlying database systems.

In FIG. 4 details of the operation, or steps, of the first software module, module I, of the program; namely, the Get Catalog module are set forth. Module I retrieves information about a schema from the system catalog of a specified subservient database system. The retrieved information includes the name of the schema specified, names of all the relations, names of all the attributes of each relation, their data type, length, etc.

The user is given the option to retrieve the schema of each subservient, or underlying, database depending on either on ownership of, or access privilege to, the underlying databases. Once an underlying database management system is selected, its catalog of information is retrieved by querying the system catalog in which the schema is stored for information about relations, and this information is written into a file of the host data processing system. This file serves as input to module II, the GET KEY module illustrated in FIGS. 5a and 5b. An error message appears in case there are no accessible relations, and the program allows the user to select another underlying database management system.

Figure 5A:
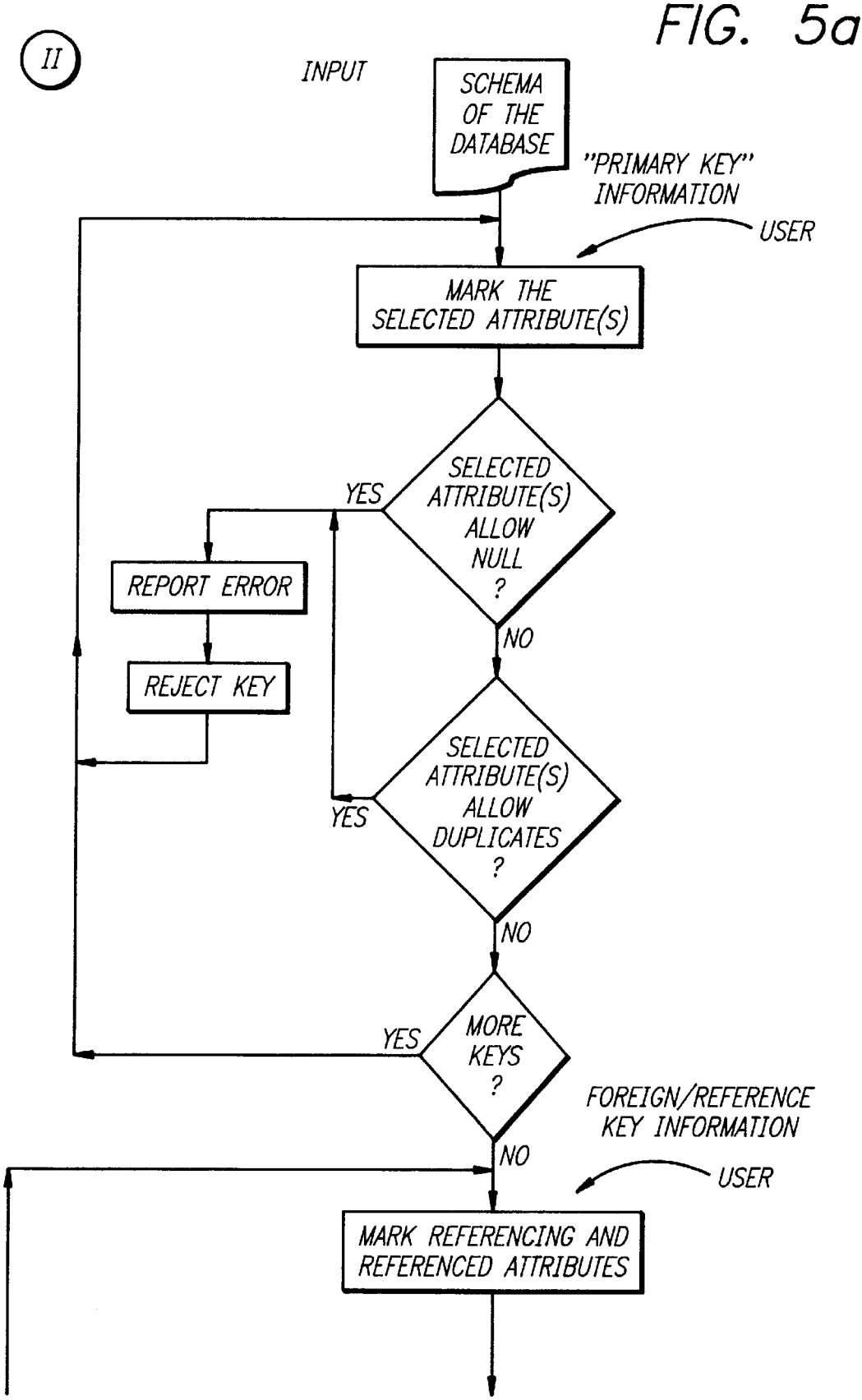
FIGS. 5a and 5b are a flow chart of the software module that identifies keys and other dependency information.
Figure 5B:
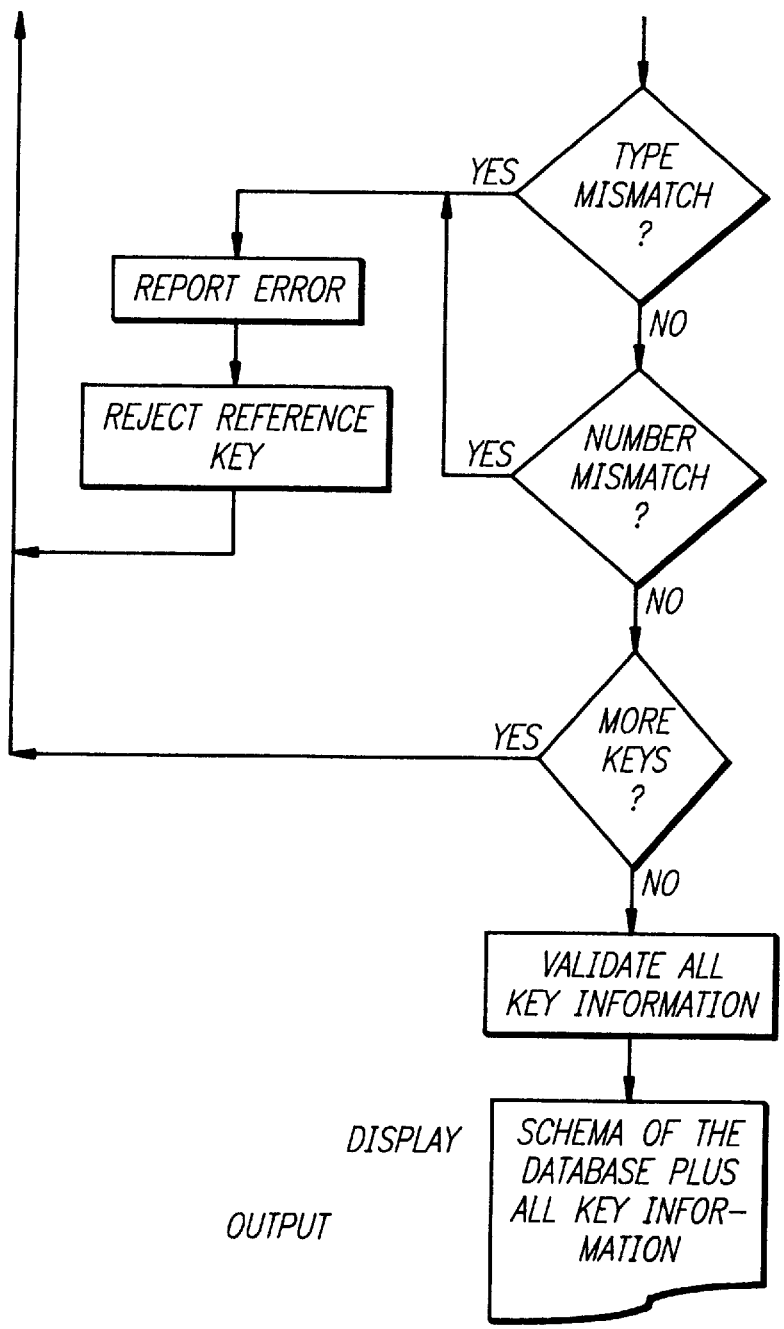

The flow chart of module II, the GET KEY, module is presented in FIGS. 5a and 5b. Since in a relational database system model, the relationships between attributes of a relation known as functional dependencies, cannot be represented explicitly, this module is used to capture and represent them separately. The input to this module is the underlying database system's name, the name of its schema, names of all the relations in the schema, names of all attributes and their data type, their length, and their allow null field value. The output of this module is the input data plus the primary key for each relation, and all relationships between source and destination relations.

The GET KEY module, Module M2 of FIG. 2a is a tool, or software algorithm, for asserting object dependencies. It has a menu-driven user interface that enables the user to specify keys and relationships As the user enters the information about keys and relationships the module validates them for correctness. The validations for the candidate keys are as follows:

Checking to determine if any of the attributes that are designated as a candidate key allow a null value.

Retrieving such instances and checking for duplicates of the candidate key value.

When there is an error, the user is informed through a message that the candidate key is not accepted. The user is allowed to specify many candidate keys and to select one of them as a primary key. The first candidate key is the default primary key. The user can specify the references which are also validated for correctness. The validations performed for the references are as follows:

Checking to determine if the name and data type of the referencing and the referenced attributes match.

Checking to determine if references are made to the candidate key of the referenced relation. In this check, there should be references for all the attributes of the candidate key.

Checking to determine if the number of distinct values of referencing attributes is greater than the number of values of the candidate key of the referenced relation. Whenever there is an error in specifying a reference, it is indicated through a message to the user.

Software module II identified by a Roman II in a circle in FIG. 5a, also helps to identify name overloading. Any attribute whose name is repeated in more than one relation is checked to determine if it is being referenced by any other relation or as referencing any other relation. If both the checks fail, then it is treated as a name overloading problem. The name of the attribute is changed internally.

The interface to this module is menu-driven. Once the "GetKey" menu item is selected, the "PrimaryKey", "CandidateKey", "ReferenceKey", "Enter", and "Done" buttons appear on the screen. When all the keys are entered, the "Done" button is selected.

Figure 6:
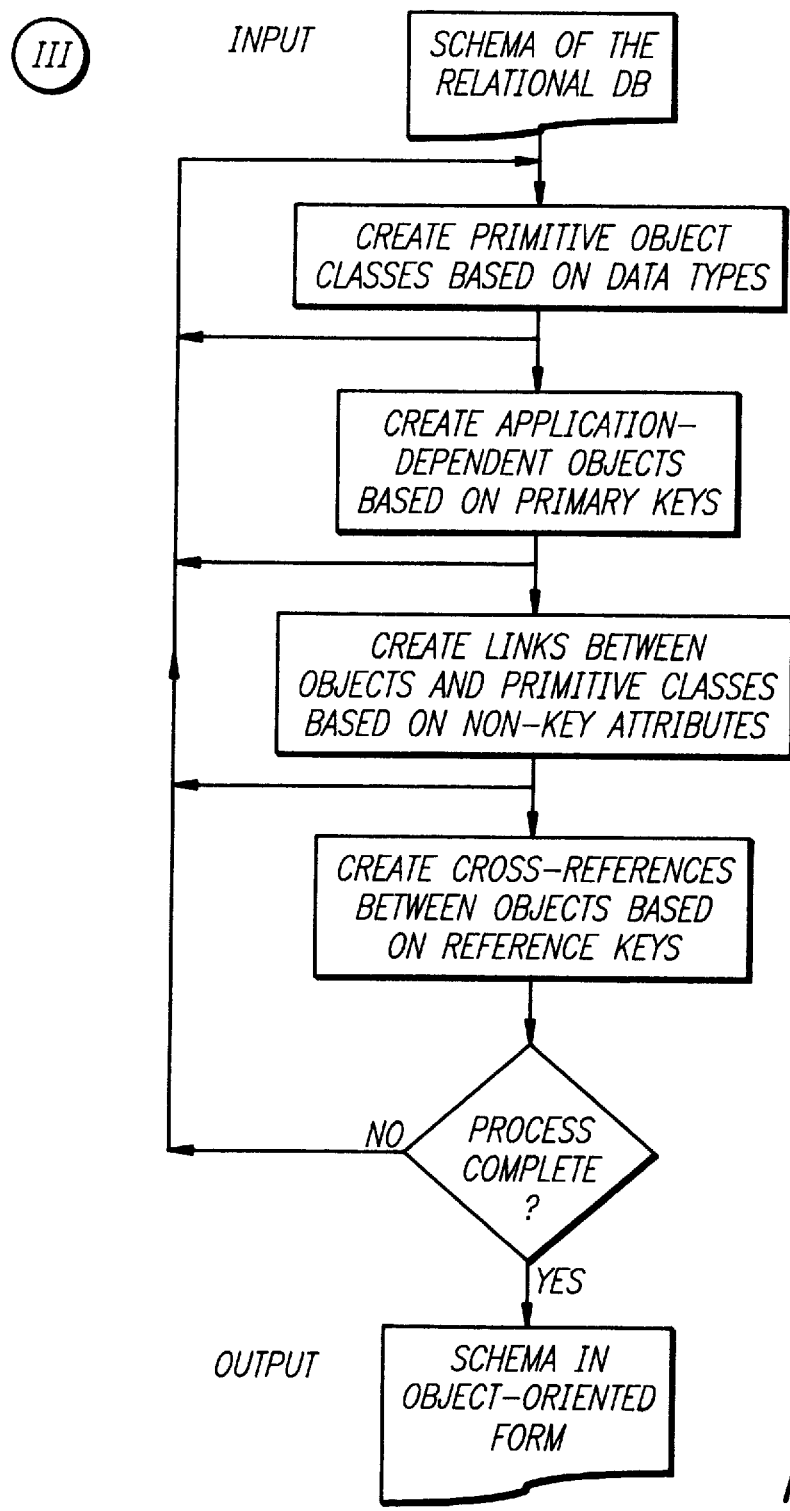
FIG. 6 is a flow chart of the module for transforming a schema in "Third Normal Form" into an object-oriented (OO) form.

FIG. 6 outlines the process of Conversion from a Relational to an Object-Oriented Schema, identified as software module III by a Roman III in a circle in FIG. 6. The input to module III is the schema along with all relations, all attributes, primary keys, and all references that are made by attributes of one relation to the keys of other relations. The input to module III is derived from module II. The outputs of module III are the object classes involved, the properties of the object classes (represented as simple attributes), and the relationships among the object classes (represented as cross reference relationships). The relationships are derived from the dependencies obtained from module II. Module III first generates primitive object classes such as the integer, Boolean, and string classes, based on the data types of the attributes of all the relations of the schema. Following this step, it generates the application-dependent object classes (known as user-defined objects) by using the primary keys of the relations. In this step, first relations with single attribute primary keys are considered (i.e., simple primary keys). If more than one relation has the same attribute as a primary key, the algorithm will join all those- relations on the primary key attribute(s) and make the resultant relation a user-defined object class. Secondly, relations whose primary key has more than one attribute (i.e., a composite primary key) are handled in the same way to obtain user-defined object classes. The final step in the process of conversion is the generation of attributes. The algorithm generates attributes based on the attributes in the primary key, cross reference relationships based on reference keys, and other attributes based on the remaining attributes in the relations. For additional information concerning module III, reference is made to the above identified cross-referenced patent application entitled Method for Converting a Database Schema in Relational Form to a Schema in Object-Oriented Form.

Figure 7A:
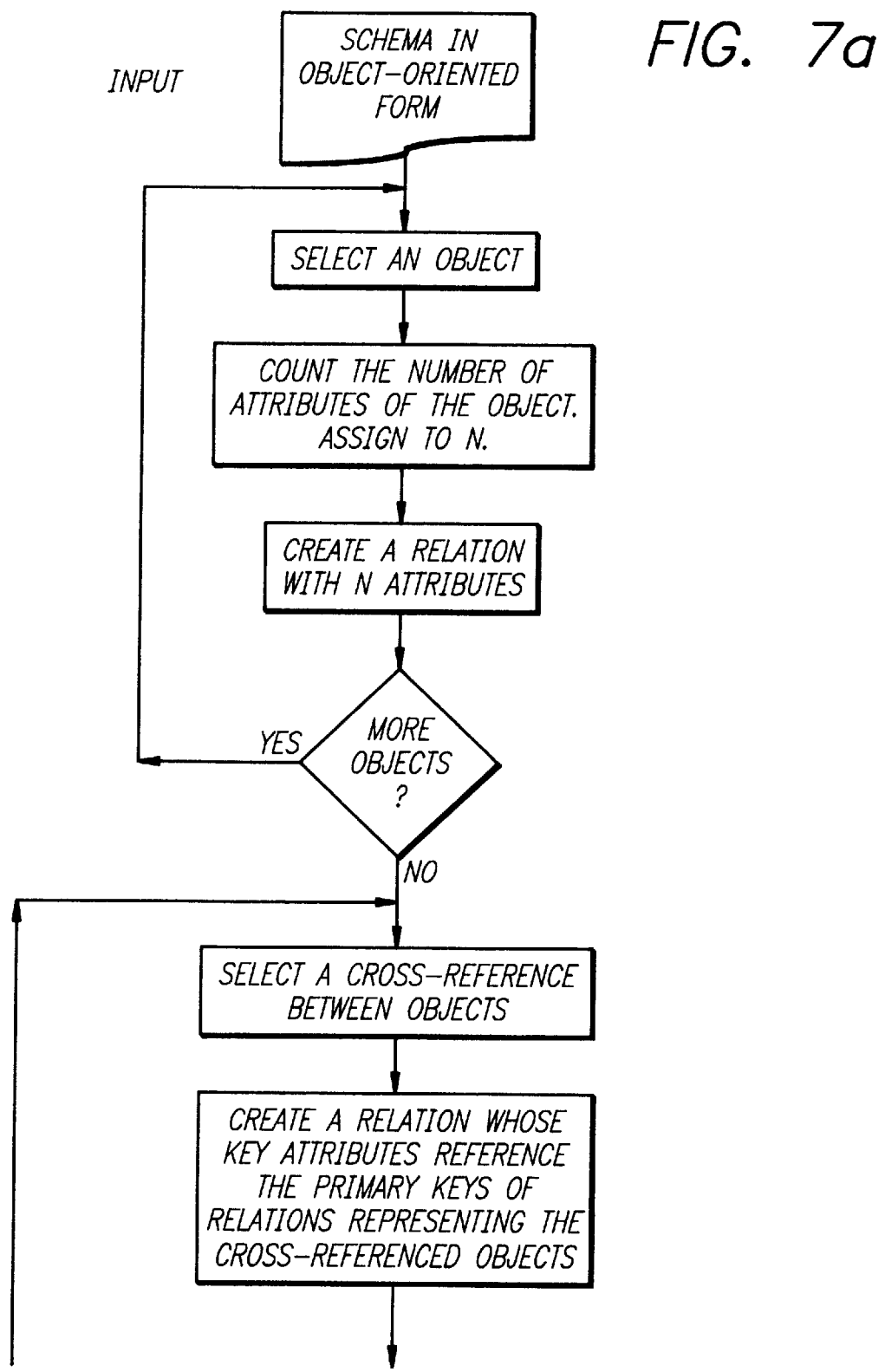
FIGS. 7a and 7b are a flow chart of the module for transforming a schema in object oriented (OO) form to that of a relational database in "Third Normal Form".
Figure 7B:
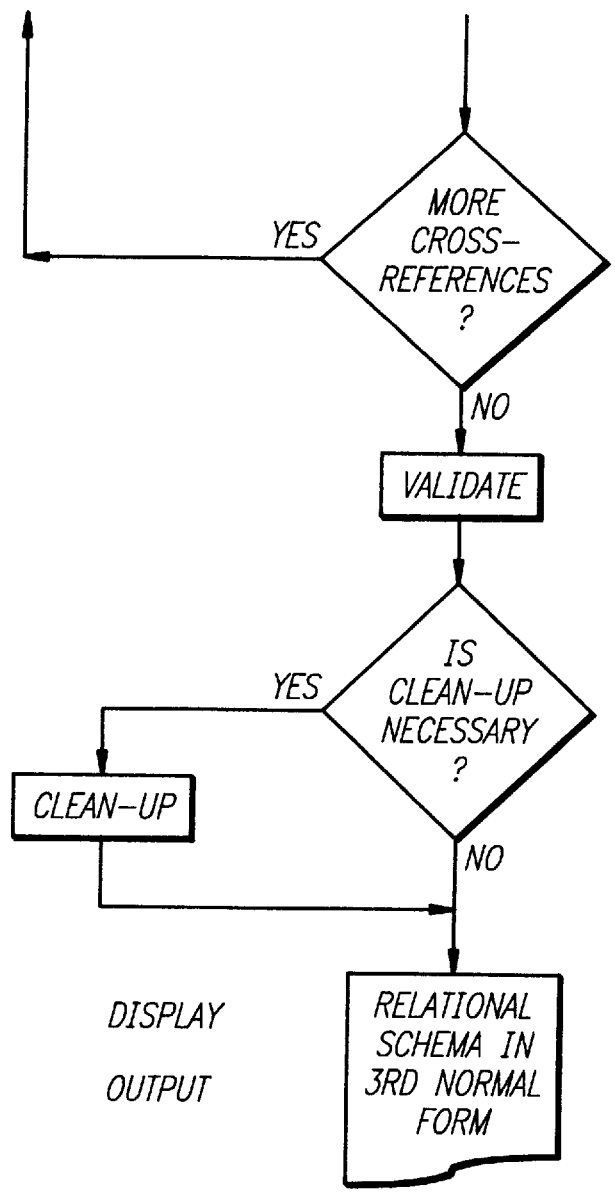

FIGS. 7a and 7b illustrate the flow chart of module IV, identified by Roman numeral IV in a circle in FIG. 7a, the schema normalization module, whose purpose is to generate a normalized view of the input schema. The use of this module is optional. The input to module IV is information on mapping between the components of the object-oriented schema and base, or physically existing relation components, for example, the mapping between the object classes and corresponding base relations and the mapping between the object attributes and the corresponding base attributes. The output of this module includes:

A set of normalized views created on the base relations.

A mapping of the object classes and corresponding normalized views.

A mapping of the attributes and corresponding attributes in normalized views.

An object-oriented schema can be converted to a relational format using module IV identified by a Roman numeral IV in a circle in the flow chart which is illustrated in FIGS. 7a and 7b. Module IV can be used in place of module VIII to produce the desired schema of a relational in "Third Normal Form". The resulting relational schema satisfies "Third Normal Form" database constraints. The tool may carry out certain "cleaning up" tasks in order to ensure conformation. For example, if there are multiple relations with the same dependency features (i.e. identical primary keys,) the tool will restructure the relations by joining the partial relations.

The graphical interface of the schema integration tool displays the schema graphically. The user then works with the graphical display instead of writing computer commands.

Figure 8A:
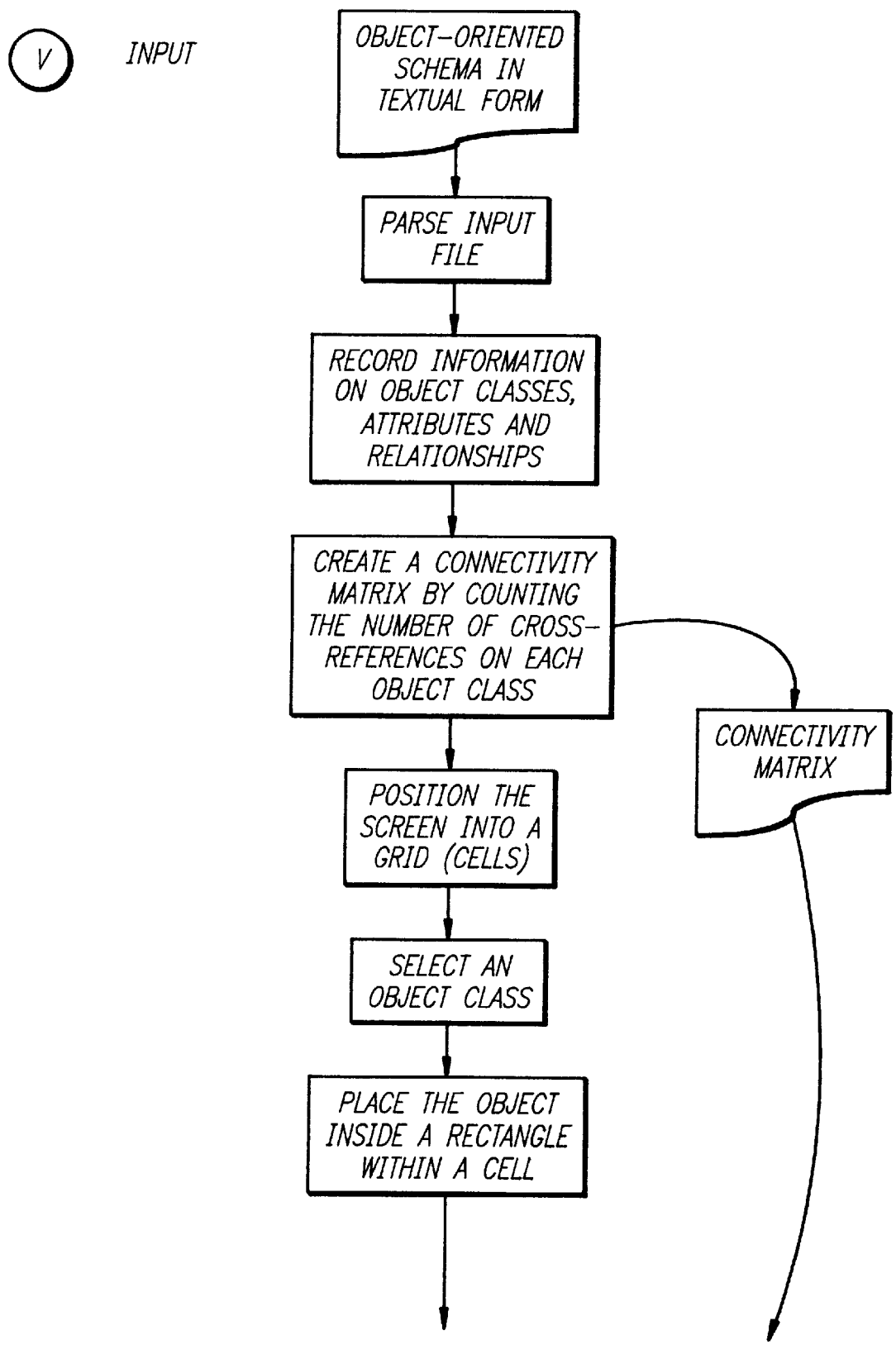
FIGS. 8a and 8b are a flow chart of the module that graphically displays the schema.
Figure 8B:
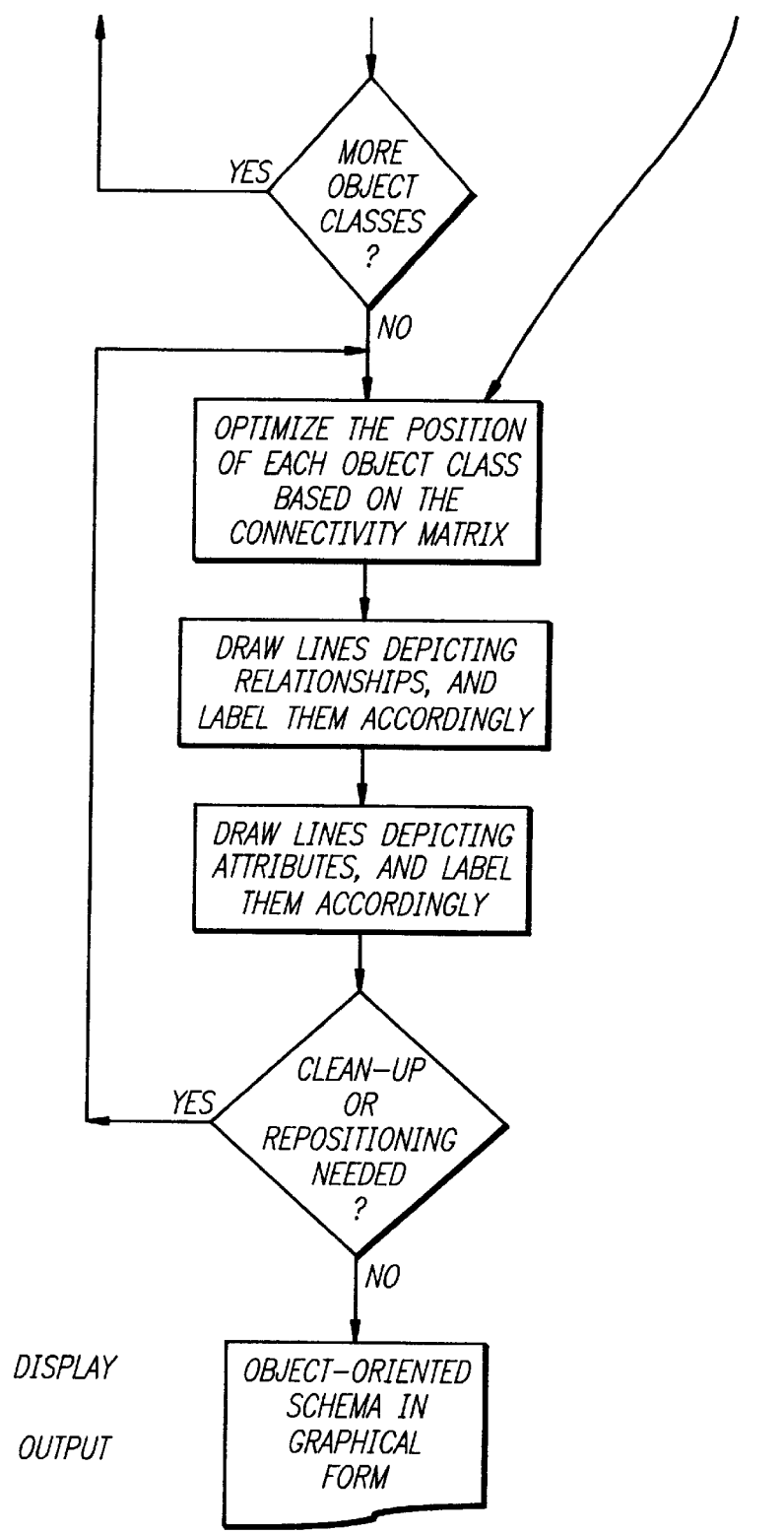

Module V identified by a roman numeral V in a circle in FIG. 8a, the steps of which are set forth in FIGS. 8a and 8b, displays schemas graphically. Software module V provides a visual interface to the schema integration tool. The input to this module is an object-oriented schema with the object classes, attributes, and relationships in textual format, and the output is a graphical representation of the object-oriented schema. First the input file is parsed; i.e., analyzed. The parser records information about the object classes, their attributes, and relationships. Depending on the size of the schema (i.e. the number of object classes) the screen is divided into a grid of either 3 by 3 cells, 3 by 5 cells, or 5 by 5 cells. Once a grid is selected, the object classes are placed in the grid first. These are represented by rectangles. Then, the lines, or arcs, labels and arrows that depict the relationships between the object classes are drawn. Finally, the attributes of each object class are drawn. Graphical representation of each attribute consists of four parts: a circle that represents the base type, or fundamental, type; a line extending from the object class to the circle; an arrow at the circle-end of the line; and a label of the attribute name. After the design is complete, the window is opened and all the display elements are drawn. For additional information concerning module V, reference is made to the above identified cross-referenced patent application entitled Method of Graphically Displaying an Object-Oriented Schema.

Figure 9A:
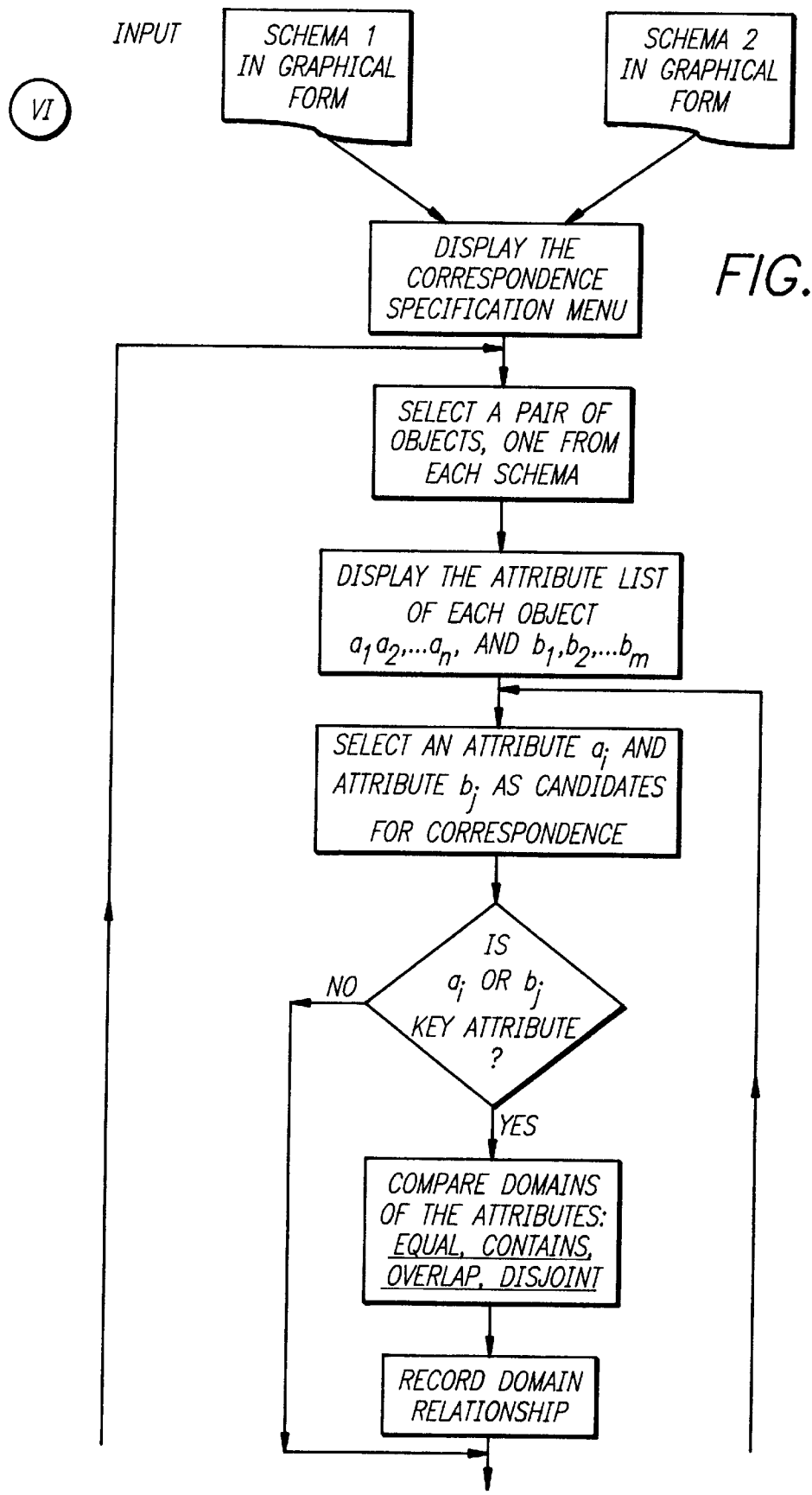
FIGS. 9a and 9b are a flow chart of the module that interactively specifies correspondences between two schemas.
Figure 9B:
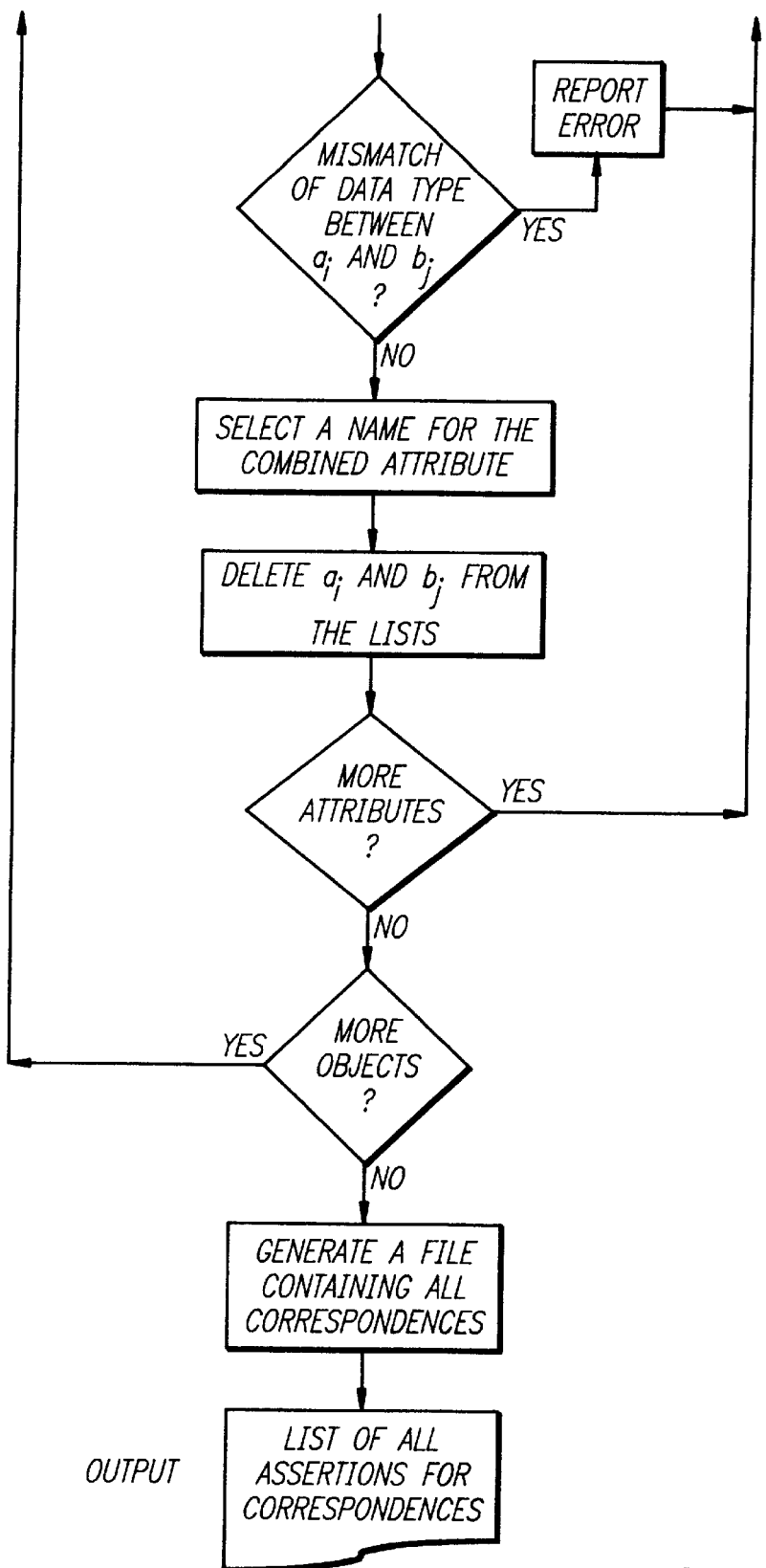

FIGS. 9a and 9b outline the steps comprising module VI denoted by a Roman numeral VI in a circle in FIG. 9a which is used for the specification of correspondence between the object classes of the two schemas to be integrated and between the attributes of these object classes. The input to module VI are two object-oriented schemas displayed in graphical form. The output of module VI is a file that contains the correspondences specified by the user. On invocation, this module checks that the graphical displays of the two desired schemas are on the screen. If not, it displays an error message and returns to "MainMenu" for further instructions. If the two graphical displays exist, then the menu for correspondence specification is displayed.- The correspondences between object classes can be specified by selecting the object classes from the graphical display by clicking the appropriate object classes, one from each schema. The attributes of the selected object classes are retrieved and displayed as lists. The correspondences between the attributes can be specified by selecting appropriate list elements. The attributes of the object classes that correspond to each other are selected. Once this selection is completed a check is performed to determine if both are of compatible data types. If not, the specified correspondence is invalidated and an error message is displayed as the program continues to accept new correspondences. If either, or both, of these two attributes is a primary key or a part of a primary key, then the domain information is captured. There are five types of domain correspondences among the attributes; they are Equals, Contains, Contained in, Overlaps, and Disjoint. In the case of Equals, it means that for each instance of the attribute in one object class, there is also one and only one instance in the other object class. In the case of Contains, the instances of the attribute in the first object class are a superset of the instances of the attribute in the second object class. In the case of Contained, the instances of the attribute in the first object class are a subset of the instances of the attribute in the second object class. In the case of Overlaps, the instances of the attribute in the first object class overlap with the instances of the attribute in the second object class. In the case of Disjoint, the instances of the attribute in the first object class are disjoint from the instances of the attribute in the second object class. The domain relationship captured in this phase will be used during the integration phase. In case both the attributes are non-primary keys, then the information about which of these two attributes should be given preference is captured. Once attribute correspondence for the selected object classes is complete, then correspondence among another group of object classes may be done. This process continues until no more object class correspondences exist. After completion of this session, the actual integration starts. For additional information concerning module V, reference is made to the above identified cross-referenced patent application entitled Graphical Interface for Correspondence Specification in Schema Integration.

Figure 10A:
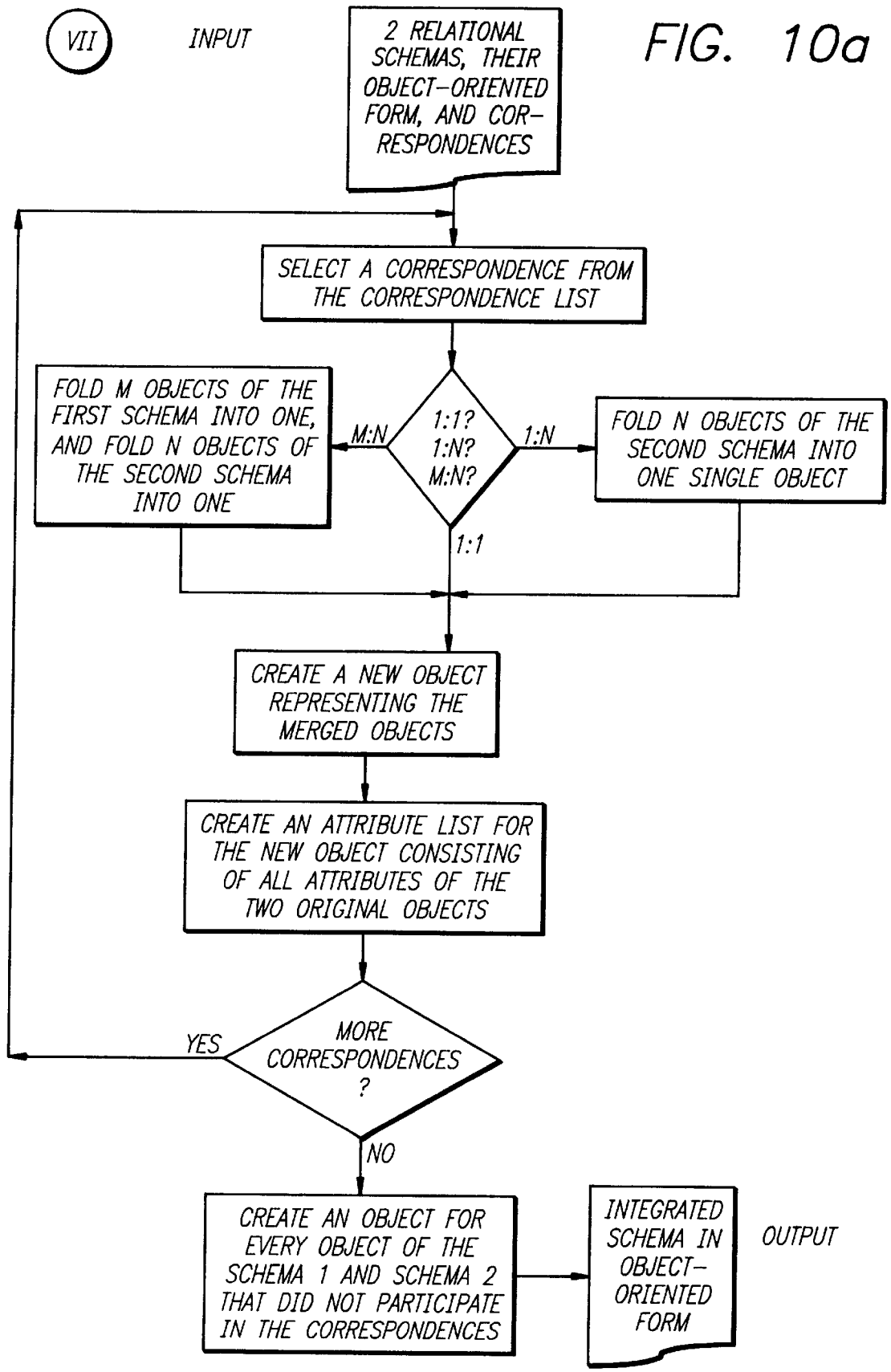
FIG. 10 is a flow chart of the software module that integrates two schemas based on given correspondences.

FIG. 10 is the flow chart of module VII denoted by a Roman number VII in a circle in FIG. 10a, which integrates two object-oriented schemas and generates an object-oriented schema representing the integration of the two given schemas. The integration is performed by using the correspondences specified by the user as outlined above. The output of module VII is a file containing the object-oriented description of the integrated schema. Once the two files containing the object-oriented description of the two schemas are read, the integration process is performed by using correspondences specified, according to the following rules:

1. Object classes between two schemas are merged using the merge operator. This operator merges two objects, each from a different schema based on assertions made on the attributes of those objects.
2. Object classes within the same schema are folded together using the fold operator. The fold operator allows a general object to absorb a more specific object, for example an object such as a "student" is more specific than an object such as "person". The fold operator allows these two objects to be combined, by "person" absorbing "student".
3. Correspondences between object classes to be merged can be 1:1, 1:N or M:N.
   a. If the correspondence is 1:1, then the two object classes from each schema are merged into one. The name of the merged object class is specified by the user.
   b. If the correspondence is 1:N, then the N object classes in the corresponding schema are first folded together. This object class is then merged with the object class of the other schema.
   c. If the correspondence is M:N, then the M object classes of one schema are first folded into one, then the N object classes of the other schema are folded into one, and finally, these two schemas are merged into one.
4. If any correspondence is specified between the attributes of the two object classes to be merged, then these attributes are integrated, resulting in a single attribute in the merged object class.

Figure 11A:
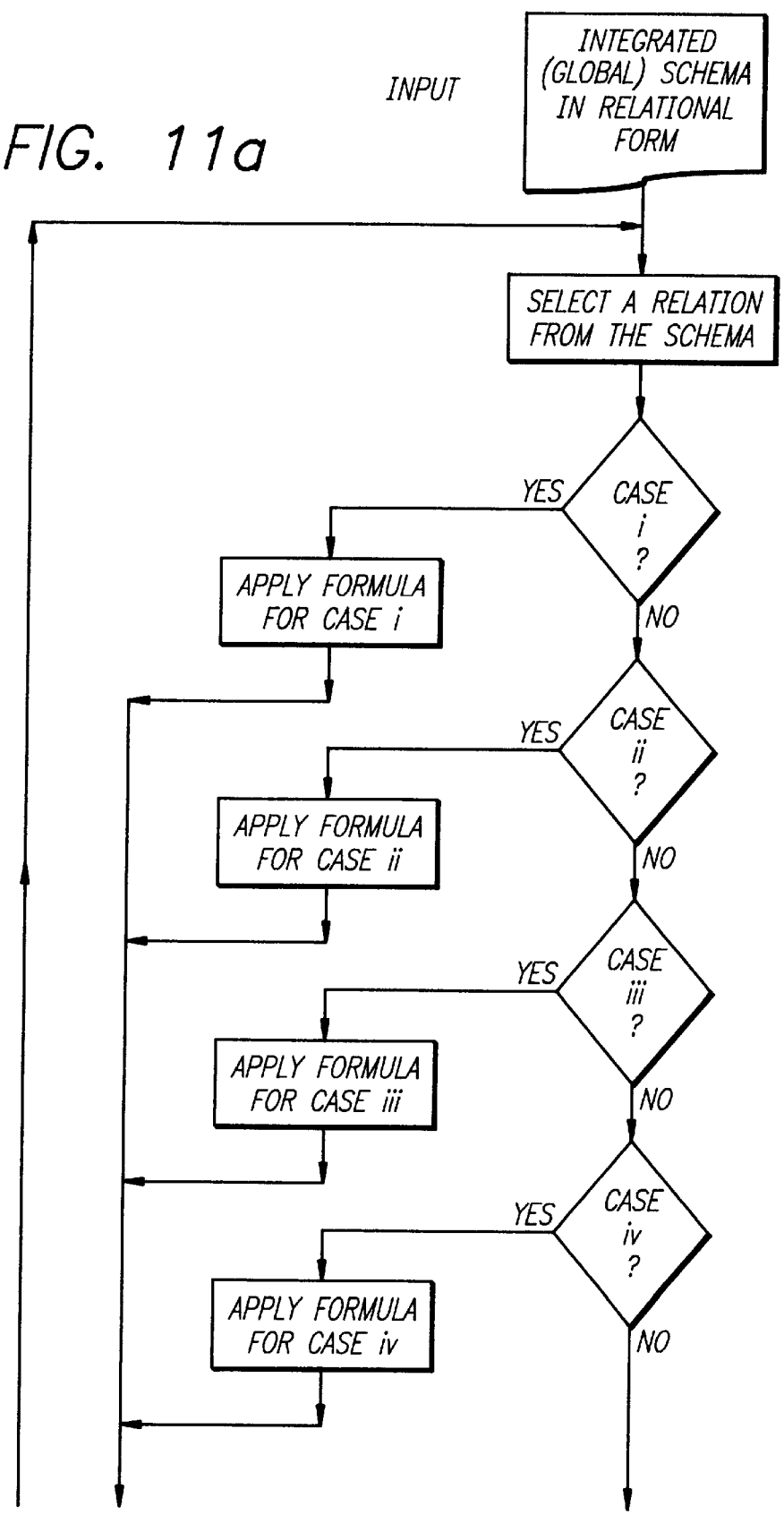
FIGS. 11a and 11b are a flow chart of the software module for the generation of SQL commands that create the relations prescribed by the global schema.
Figure 11B:
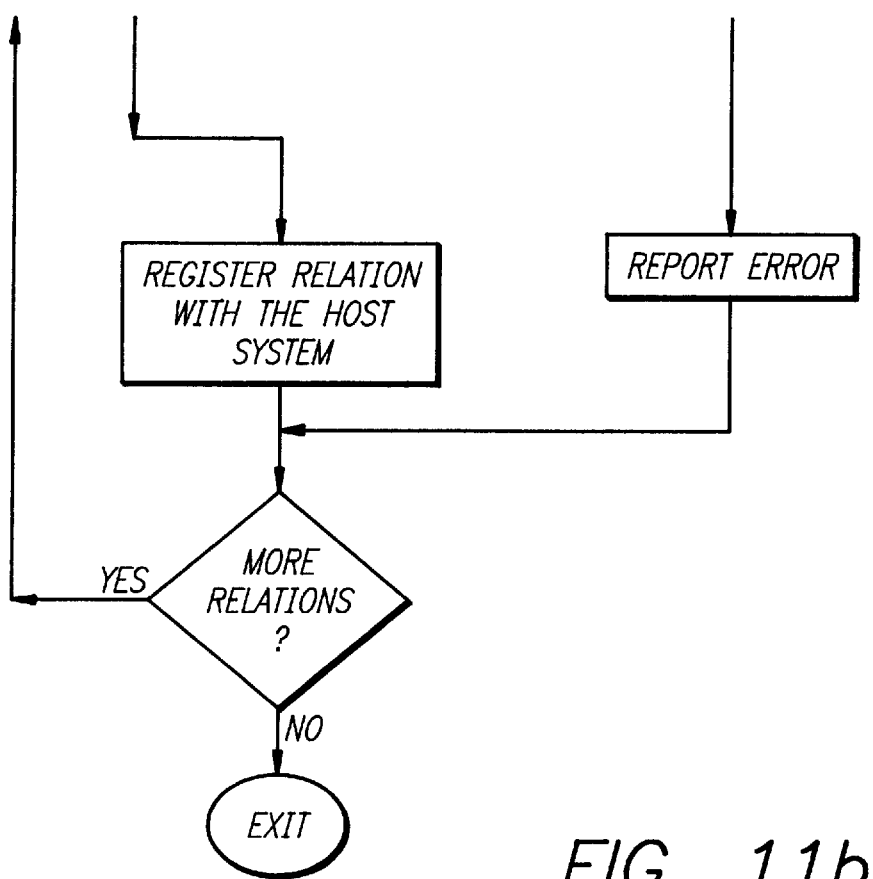

FIG. 11a and 11b are a flow chart of software module VIII, identified by a Roman number VIII in a circle in FIG. 11a; namely, a view generation module. Module VIII creates views corresponding to the integrated relational schema using SQL statements. The following inputs are required:

1. Relational schemas from the participating database systems.
2. Correspondences specified between the participating schemas.
3. An integrated relational schema.

An SQL statement generates each relation in the integrated schema. For this purpose, the following cases are considered:

The relation in the integrated schema corresponds to one and only one relation of one of the participating schemas.

The relation in the integrated schema is a combination of two relations, one from each participating schema, and the correspondence is specified on the primary key attributes of the relations.

The relation in the integrated schema is a combination of two relations, one from each participating schema, and the correspondence is specified on the primary key attributes and other attributes of the relations.

The relation in the integrated schema is a combination of two relations, one from each participating schema, and the correspondence is specified on non-primary key attributes of the relations.

The following notation is used in describing the above four cases.

The participating schemas: Schema 1 and Schema 2.

Schema 1 has relations r1, r2, r3, . . .

Schema 2 has relations s1, s2, s3, . . .

r1=(pk1, a11, a12, . . . )

r2=(pk2, a21, a22, . . . ) and so on.

Also, s1=(p1, b11, b12, . . . )

s2=(p2, b21, b22, . . . ) and so on.

The integrated schema consists of relations i1, i2, i3, . . .

i1=(k1, ia11, ia12, . . . )

pk$<i>$, p$<i>$, k$<i>$ represent the primary key attributes of r$<i>$, s$<i>$, and i$<i>$ respectively, where $<i>$ denotes the relation number.

SQL statements:

Case 1: The relation in the integrated schema corresponds to one and only one relation of one of the participating schemas.

Example: i1 corresponds to r1.
CREATE VIEW i1 (k1, ia11, ia12, . . . )
AS SELECT *
FROM r1

Case 2: The relation in the integrated schema is a combination of two relations, one from each participating schema, and the correspondence is specified on the primary key attributes of the relations.

Example: i1 corresponds to r1 and s1. The correspondence specified on the primary key attributes can be Equals, Overlaps, Contains or Contained in.

CREATE VIEW i1 (k1, ia11, ia12, . . . )
AS

```
SELECT r1.pk1, r1.a11, ..., s1.b11, ...
FROM r1, s1
WHERE r1.pk1=s1.p1
UNION
    SELECT r1.pk1, r1.a11, ..., NULL, NULL, ...
    FROM r1, s1
    WHERE r1.pk1<>s1.p1
UNION
    SELECT s1.p1, NULL, NULL, ..., s1.b11, ...
    FROM r1, s1
    WHERE s1.p1<>r1.pk1
```
Example: i1 corresponds to r1 and s1. The correspondence specified on the primary key attributes is disjoint.
```
CREATE VIEW i1 (k1, ia11, ia12, ... )
AS
    SELECT r1.pk1, r1.a11, ..., NULL, NULL
    FROM r1
UNION
    SELECT s1.p1, NULL, ..., s1.b11, ...
    FROM s1
```
Case 3: The relation in the integrated schema is a combination of two relations, one from each participating schema, and the correspondence is specified on the primary key attributes and other attributes of the relations.

Example: i1 corresponds to r1 and s1. The correspondence specified on the primary key attributes can be Equals, Overlaps, Contains, or Contained in. Also, r1.a11 corresponds to s1.b11, and the retrieval is from r1.a11.
```
CREATE VIEW i1 (k1, ia11, ia12, ... )
AS
    SELECT r1.pk1, r1.a11, ... s1.b12, ...
    FROM r1, s1
    WHERE r1.pk1=s1.p1
UNION
    SELECT r1.pk1, r1.a11, ..., NULL, NULL, ...
    FROM r1, s1
    WHERE r1.pk1<>s1.p1
UNION
    SELECT s1.p1, s1.b11, NULL, ..., s1.b12, ...
    FROM r1, s1
    WHERE s1.p1<>r1.pk1
```
Case 4: The relation in the integrated schema is a combination of two relations, one from each participating schema and the correspondence is specified on non-primary key attributes of the relations.

Example: i1 corresponds to r1 and s1, and r1.a11 corresponds to s1.b11.
```
CREATE VIEW i1 (k1, ia11, ia12, ... )
AS
    SELECT r1.pk1, r1.a11, ..., NULL, NULL
    FROM r1
UNION
    SELECT s1.p1, s1.b11, NULL, NULL, ..., s1.b12, ...
    FROM s1
```
For additional information concerning modules VII and VIII reference is made to the above identified cross-referenced patent application entitled Method for Generating SQL Commands to Create an Integrated Global Schema.

In summary, the input to the schema integration tool consists of two schemas of two relational database management systems and the output of the tool is a schema that represents the integration of the two input schemas. The tool will display the integrated schema graphically and, once verified by the user, will generate the underlying connections among the databases.

For large schemas (those that contain numerous relations, most of which are not expected to correspond to any relations in other schema) the method allows the user to filter out those relations not expected to participate in the integration.

The user provides some basic dependency information for each of the schemas, one at a time. The tool uses this information to convert the schemas into an object-oriented form. The two schemas are then presented graphically on the screen of a CRT of the host computer system. The graphical interface allows the user to interact with the program by moving the computer mouse to the appropriate zones of the screen and by pointing, clicking and dragging the icons and menus. Specifically, by clicking on appropriate objects and their attributes, the user can specify the corresponding objects (i.e. those entities that relate to the same concepts in the real world.) These specifications are the basis for the assertions which are used by the tool to integrate the two schemas. The integrated schema and the resulting relations are then displayed to the user.

This invention provides the users with a capability to view data in many local databases in the same application area through one integrated schema in a federated database system. Schema integration is performed by a person who knows the semantics of the existing local, or underlying, database systems. Since schema integration is performed by acquiring semantics from the user, the interface must be expressive and comprehensive. As the relational model fails to achieve this, the object-oriented model is used. Thus, at the top level, there are three steps: firstly, conversion from a relational to an object-oriented database schema; secondly, an integration step in which correspondences are specified on the schemas and they are integrated using the correspondences; thirdly, converting the unified object-oriented schema to a relational schema.

The Schema Integration Tool meets end-user requirements by providing the following:

A user interface that assists a database designer in the pre-integration phase;

A translation of the relational schemas into an objected-oriented model allowing the user to deal with the schema elements as objects;

A user interface that allows the specification of assertions during the conformation phase; and A rendition of a relational view definition that integrates the different schemas under consideration.

The process of schema integration is carried out in the following order:

1. The user chooses whether to integrate the schemas that the user owns or the schemas to which the user has access permission.
2. A list of schemas is displayed. The user selects one of the schemas that is considered for integration.
3. The information about the databases in relational format is obtained by using SQL commands.
4. The functional dependencies in the relational schema are obtained in the form of primary keys and reference keys. This is done by using a display that is in a table format.
5. The relational schema is converted to an object-oriented schema by generating "object classes", "relationships", and "attributes".
6. The object classes, the relationships, and the attributes are displayed graphically. Arcs represent relationships/attributes, and boxes represent object classes.

7. Another schema is selected from the list of databases, and the steps mentioned above are repeated for that schema to obtain a display of the object-oriented schema. At this point, the two schemas are graphically displayed.

8. As the graphical views of both the schemas are displayed, the user selects the "Integrate" option to integrate the two schemas.

9. The user specifies the correspondences between the object classes and between the attributes of the object classes. This phase is carried out by clicking on the object classes, selecting the attribute, and selecting the type of correspondence.

10. An integrated schema is generated using the correspondences that are specified in the above step. This schema is in an object-oriented format.

11. The integrated schema is displayed in graphical format.

12. The integrated schema is converted to a relational format, a view of which shows the relations of the integrated schema.

13. The relational views are created for each of the schemas that are integrated. This is performed by using the conversion information from the relational schema. The normalized relational views are created on the base relations of the schemas under consideration.

14. The relational views are created for the integrated schema using the object-oriented representation of the integrated schema. The relational views that are developed in this stage are used to generate the final relational views based on the underlying databases.

15. A mapping of the relational views of the integrated schema to the base relations is performed by using the information about the relational views of individual schemas and the integrated schema.

16. Based on the relational views of the integrated schema and on the normalized views generated in the earlier stages, the integrated relational views are created. These relational views are generated in terms of the normalized database schemas.

What is claimed is:

1. In a distributed database system (DDBS) having at least two independent database systems (DBS)s with each DBS including in addition to its database, a database management system (DBMS), and a system catalogue which includes a schema of the database, a representation of the structure of the database defining the kinds of data stored in the database but excluding the actual data; the DDBS including a distributed data access (DDA) software module which provides a communication capability between the DDBS and the independent DBSs; the method of producing a global schema including desired objects and associated attributes from the schemas of the two independent DBSs, the improvements comprising the following steps:

a, obtaining the schema of each of said independent DBSs;

b, identifying primary keys, foreign keys and data dependencies of the schemas of each of the two independent DBSs;

c, converting the schemas of each of the two independent DBSs to schemas in object-oriented form;

d, normalizing each of the object-oriented forms of the schemas produced in step c;

e, defining equivalence of objects of the two normalized schemas produced in step d;

f, integrating the two object-oriented schemas to produce a global object-oriented schema;

g, converting the global object-oriented schema of step f to produce a global schema in a relational form;

h, developing SQL commands for realizing the global schema within the DDA as a virtual database system satisfying all the requirements outlined in step g for accessing data from the independent database systems.

2. The method of claim 1 in which the independent database systems are in relational form.

3. The method of claim 2 in which each of the two independent database systems are heterogeneous.

4. The method of claim 3 in which step d further includes graphically displaying the normalized object-oriented forms of the schemas.

5. The method of claim 4, in which step g, further includes eliminating extraneous data from the global object-oriented schema produced in step f.

6. The method of claim 5 in which the distributed database system resides in a computer system including a memory system.

7. The method of claim 6 in which the global relational database schema produced in step g and the SQL commands developed in step h are stored in the memory system of the host computer system.

8. In a distributed database system (DDBS) having at least two independent heterogeneous database systems (DBS)s with each DBS including in addition to its database in a relational database form, a database management system (DBMS), and a system catalogue which includes a schema, a representation of the structure of the database defining the kinds of data stored in the database but excluding the actual data; the DDBS includes a distributed data access (DDA) software module which provides a communication capability between the DDBS and the independent DBSs; the method of producing a global schema including desired objects and associated attributes of the two independent DBSs, the improvements comprising the following steps:

a, obtaining the schema of each of said independent DBSs;

b, identifying primary keys, foreign keys and data dependencies of the schemas of each of the independent DBSs;

c, converting each of the schemas from a relational database form to an object-oriented form of a database;

d, normalizing each of the object-oriented forms of the schemas produced in step c;

e, producing a graphical display of the normalized object-oriented forms of the schemas produced in step d;

f, defining equivalence of objects of the two schemas displayed in step e;

g, integrating the two object-oriented schemas to produce an integrated object-oriented schema;

h, converting the integrated object-oriented schema produced in step g to an integrated schema in relational database form;

i, eliminating extraneous data fields from the integrated schema produced in step h; and j, developing SQL commands for obtaining data from the databases of the independent database systems realizing the global schema within the DDA as a virtual database system satisfying the requirements outline in step h for accessing data from the independent database systems.

9. The method of claim 8 in which the distributed database system includes a computer system in which the distributed database system resides, said computer system including a memory system, and subservient computer systems in which the independent heterogeneous database systems reside.

10. The method of claim 9 in which the integrated schema at the completion of step i and SQL commands developed in step j are stored in the memory system of the computer system in which the distributed data base system resides, and from which they are retrieved as needed.

11. A method by which a distributed database system (DDBS) which includes a computer system in which the DDBS resides, and at least "n" independent database management systems (DBMS)s with each independent DBMS residing in a computer system, where "n" is an integer greater than 1; each of the "n" independent DBMSs including a database (DB), and a system catalog which includes a schema of the independent DBMS database, where a schema of a given DB is a representation of the structure of the DB defining the data stored therein but excluding actual data; the computer system in which the DDBS resides including a distributed data access (DDA) software module for providing communications between the computer system in which the ddbs resides, the computer systems in which the independent DBMSs reside, and the independent DBMSs residing therein for producing a single integrated schema from the "n" independent database management systems; comprising the steps of:

a, after selecting a computer system in which a first independent DBMS resides, obtaining the schema of that independent DBMS and displaying said schema;

b, after identifying primary keys, foreign keys and data dependencies of the displayed schema, transforming the schema to a "Third Normal Form" if not in that form as displayed;

c, transforming the schema in Third Normal Form to an object-oriented DB form;

d, displaying the object-oriented DB schema;

e, repeating steps a–d with respect to a second independent DBMS;

f, after specifying correspondences between the two displayed object-oriented DB schemas and eliminating conflicting assertions, merging the two object-oriented schemas to produce an integrated schema in objected-oriented form;

g, repeating steps a–d, and f on the remaining independent DBMSs until the schemas of all independent DBMS, have been merged to form a single integrated schema;

h, transforming the integrated object-oriented DB schema at the completion of step g to an integrated schema in relational form;

i, generating Database Language SQL commands to create a view of the integrated schema in relational form; and j, storing the merged integrated schema of step i and the SQL commands generated in step i in a memory system of the computer system in which the DDBS resides.

12. The method of claim 11 in which the independent database management systems are relational database systems and are heterogeneous.

* * * * *